United States Patent
Kim et al.

(10) Patent No.: US 9,934,613 B2
(45) Date of Patent: Apr. 3, 2018

(54) SYSTEMS FOR CONTROLLING A MOVABLE OBJECT

(71) Applicants: Jong-Hoon Kim, Miami, FL (US);
Nagarajan Prabakar, Miami, FL (US);
S. S. Iyengar, Davie, FL (US);
Lorenzo Castillo, Miramar, FL (US);
Jon Carvajal, Hialeah, FL (US);
Eliana Almario, Miami, FL (US);
Giuseppe Vietri, Miami, FL (US)

(72) Inventors: Jong-Hoon Kim, Miami, FL (US);
Nagarajan Prabakar, Miami, FL (US);
S. S. Iyengar, Davie, FL (US);
Lorenzo Castillo, Miramar, FL (US);
Jon Carvajal, Hialeah, FL (US);
Eliana Almario, Miami, FL (US);
Giuseppe Vietri, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 14/699,526

(22) Filed: Apr. 29, 2015

(65) Prior Publication Data
US 2015/0310671 A1     Oct. 29, 2015

Related U.S. Application Data

(60) Provisional application No. 61/985,818, filed on Apr. 29, 2014.

(51) Int. Cl.
*G06T 19/00* (2011.01)
*G06F 3/0481* (2013.01)
(Continued)

(52) U.S. Cl.
CPC .......... *G06T 19/006* (2013.01); *A63H 23/08* (2013.01); *A63H 23/16* (2013.01); *A63H 30/04* (2013.01);
(Continued)

(58) Field of Classification Search
None
See application file for complete search history.

(56) References Cited

U.S. PATENT DOCUMENTS

| 9,392,212 B1* | 7/2016 | Ross | H04N 5/9305 |
| 2005/0192864 A1* | 9/2005 | Ganz | G06Q 30/0222 |
| | | | 705/14.56 |

(Continued)

FOREIGN PATENT DOCUMENTS

| EP | 0 627 248 A2 | 12/1994 |
| EP | 1 134 011 A2 | 9/2001 |
| EP | 2 251 157 A1 | 11/2010 |

OTHER PUBLICATIONS

Schmitt, Thorsten et al., "Cooperative Probabilistic State Estimation for Vision-based Autonomous Mobile Robots," *IEEE Transactions on Robotics and Automation*, Oct. 2002, 18(5):670-684.

*Primary Examiner* — Hilina K Demeter
(74) *Attorney, Agent, or Firm* — Saliwanchik, Lloyd & Eisenschenk (57) ABSTRACT

An augmented reality system is described that comprises a movable object comprising an object hardware component; a control hardware component for wirelessly transmitting and receiving signals via a communication link to the object hardware component; and a software component stored on a non-transitory computer-readable medium and in operable communication with the control hardware component. An application user interface is provided for enabling a user to
(Continued)

provide command input for controlling the movement of the movable object via the object hardware component.

18 Claims, 7 Drawing Sheets

(51) Int. Cl.
*G06F 3/0484* (2013.01)
*A63H 30/04* (2006.01)
*A63H 23/08* (2006.01)
*A63H 23/16* (2006.01)
*G06Q 10/10* (2012.01)

(52) U.S. Cl.
CPC ...... *G06F 3/04815* (2013.01); *G06F 3/04842* (2013.01); *G06Q 10/10* (2013.01)

(56) References Cited

U.S. PATENT DOCUMENTS

| | | | | |
|---|---|---|---|---|
| 2009/0137323 A1* | 5/2009 | Fiegener | ............... | A63H 3/28 463/43 |
| 2009/0318234 A1* | 12/2009 | Christensen | ............ | A63F 13/10 463/42 |
| 2010/0321389 A1* | 12/2010 | Gay | .................... | G11B 27/036 345/427 |
| 2011/0028219 A1* | 2/2011 | Heatherly | ............... | A63H 3/28 463/42 |
| 2012/0200667 A1* | 8/2012 | Gay | ........................ | A63F 13/52 348/43 |
| 2013/0178257 A1* | 7/2013 | Langseth | ................ | G06T 17/05 463/4 |
| 2013/0286004 A1* | 10/2013 | McCulloch | ........... | G06T 19/006 345/419 |
| 2014/0002444 A1* | 1/2014 | Bennett | ................... | G06F 3/012 345/419 |
| 2014/0063061 A1* | 3/2014 | Reitan | ................... | G09G 3/003 345/633 |
| 2014/0125678 A1* | 5/2014 | Wang | ..................... | A63F 13/005 345/473 |
| 2014/0214547 A1* | 7/2014 | Signorelli | ......... | G06Q 30/0267 705/14.64 |
| 2014/0273717 A1* | 9/2014 | Judkins | ................... | A63H 3/28 446/175 |
| 2014/0306866 A1* | 10/2014 | Miller | ................... | G06T 19/006 345/8 |
| 2014/0333612 A1* | 11/2014 | Itoh | ....................... | G09G 3/003 345/419 |
| 2015/0022444 A1* | 1/2015 | Ooi | ....................... | G06F 3/011 345/156 |
| 2015/0042619 A1* | 2/2015 | Forti | ..................... | G06F 3/0488 345/175 |
| 2015/0209664 A1* | 7/2015 | Haseltine | ............... | A63F 13/00 463/31 |

* cited by examiner

SYSTEMS FOR CONTROLLING A MOVABLE OBJECT

CROSS-REFERENCE TO A RELATED APPLICATION

This application claims the benefit of U.S. provisional application Ser. No. 61/985,818, filed Apr. 29, 2014, which is incorporated herein by reference in its entirety.

BACKGROUND OF INVENTION

Aquariums are popular attractions that draw great numbers of tourists every year. However, aquariums are expensive to maintain since they require large amounts of land for the facility and many employees for maintenance. Furthermore, there is virtually no interaction between the tourists and the inhabitants in the aquariums, which can limit the amount of attention younger children may give to a tour of an aquarium facility taking up to several hours.

BRIEF SUMMARY

In one aspect, the subject invention provides an augmented reality system providing remote control and interaction of an object in a space. The system can comprise an object that includes an object hardware component; a control hardware component, such as but not limited to a mobile device, with a display for wirelessly transmitting and receiving signals via a communication link to the object hardware component; and a software component stored on a non-transitory computer-readable medium and in operable communication with the control hardware component.

In some embodiments, the software component further includes a user interface for enabling a user to provide command input for controlling movement of the object via the object hardware component. The user interface can further provide visual data received from the object hardware component via the display.

In some embodiments, at least one positioning component is in operable communication with the object hardware component for providing spatial data relative to the object's surroundings. The spatial data is utilized for avoiding surrounding objects during movement of the movable object. Positioning components include, but are not limited to, sonar devices and global positioning devices (GPS).

In additional embodiments, a video camera is positioned on the object in communication with the object hardware component for streaming video to the display of the control hardware component via the communication link.

In another aspect, a computer readable storage medium having instructions stored thereon for execution by a computing device is provided. The executable method can include the following steps: in response to receiving a request to place one or more virtual object (such as virtual food) in a position, getting position coordinates of the virtual object; providing position coordinates of the virtual object to a movable object; and providing commands to the movable object to move to the position coordinates of the virtual object.

In some embodiments, the location of the movable object is determined and displayed on the display of the computing device in real-time. Likewise, the position coordinates of the virtual object can be displayed on the display of the computing device. The location of the movable object can be determined via a global positioning system, and the location of the movable object can be displayed on the display of the computing device in real-time as it moves to the position coordinates of the virtual object.

These and other aspects and advantages of the present invention will be better appreciated in view of the drawings and the following detailed description of the embodiments.

BRIEF DESCRIPTION OF DRAWINGS

For a fuller understanding of the invention, reference is made to the following detailed description, taken in connection with the accompanying drawings illustrating various embodiments of the present invention, in which.

DETAILED DISCLOSURE

Reference is made to particular features (including method steps) of the invention. The disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other elements, steps, etc. are optionally present. When reference is made herein to a method comprising two or more defined steps, the steps can be carried out in any order or simultaneously (except where the context excludes that possibility), and the method can include one or more steps that are carried out before any of the defined steps, between two of the defined steps, or after all of the defined steps (except where the context excludes that possibility).

The present invention provides a computer implemented method, system and software for augmented reality in providing remote control and interaction of an object in a space. The computer implemented method, system and software may include an application, "app," designed for at least one of a smart phone, computer, laptop, tablet computing device, and portable electronic gaming system. The app may be downloadable to be installable on multiple hardware platforms (e.g., without limitation, iPhone®, Android™, Windows Mobile®, BlackBerry®, etc.), therefore eliminating the need for dedicated control hardware components. Nevertheless, as it would be understood by those skilled in the art the computer implemented method, system and software could be utilized on a dedicated control hardware component.

As used herein, the terms "control hardware component" and "computing device" may be used interchangeably, and refer to any electronic communications device with a processor and memory that is capable of running an application comprising the software component(s) of the present invention, such as a smartphone, hand-held computer, laptop computer, desktop computer, terminal, PDA (Personal Digital Assistant), network computer, wireless communicator (such as a cellular or satellite telephone), or a multi-user computing system, etc. which is capable of communicating with a remote network, such as the internet. The control hardware component further comprises a display for a graphical user interface provided by the software component(s).

As used herein the term "server" is used to describe any computer that stores and runs a computer program, or software, of the present invention, houses a system database, and communicates periodically with the software stored and executed on users' computing devices (i.e., control hardware components). The server facilitates the collection and distribution of content to and from one or more users' computing devices. The server computer consists of one or more CPU's (Central Processing Units), memory components (i.e., RAM (Random-Access Memory)), and one or more storage devices (i.e., hard disk drives).

As used herein, the term "software" or "application" comprises programming instructions adapted for execution by a hardware element, such as a processor of a computing device, wherein the instruction comprises commands that, when executed, cause the processor to perform a corresponding set of commands. The software may be written or coded using a programming language, and stored using any type of non-transitory computer-readable media or machine-readable media well known in the art. Examples of software referred to herein in the present invention comprise any software components, programs, applications, apps, modules, computer programs, application programs, system programs, database management programs, machine programs, and operating system software. Furthermore, the software may be a web application that resides on a system server and is accessed via the Internet. It performs the same tasks as a native application, usually by downloading part of the application to the device (i.e., control hardware component) for local processing each time it is used. The application and the system comprise at least one processor and computer readable medium containing computer executable instructions to carry out the methods of the present invention.

Figure 1:
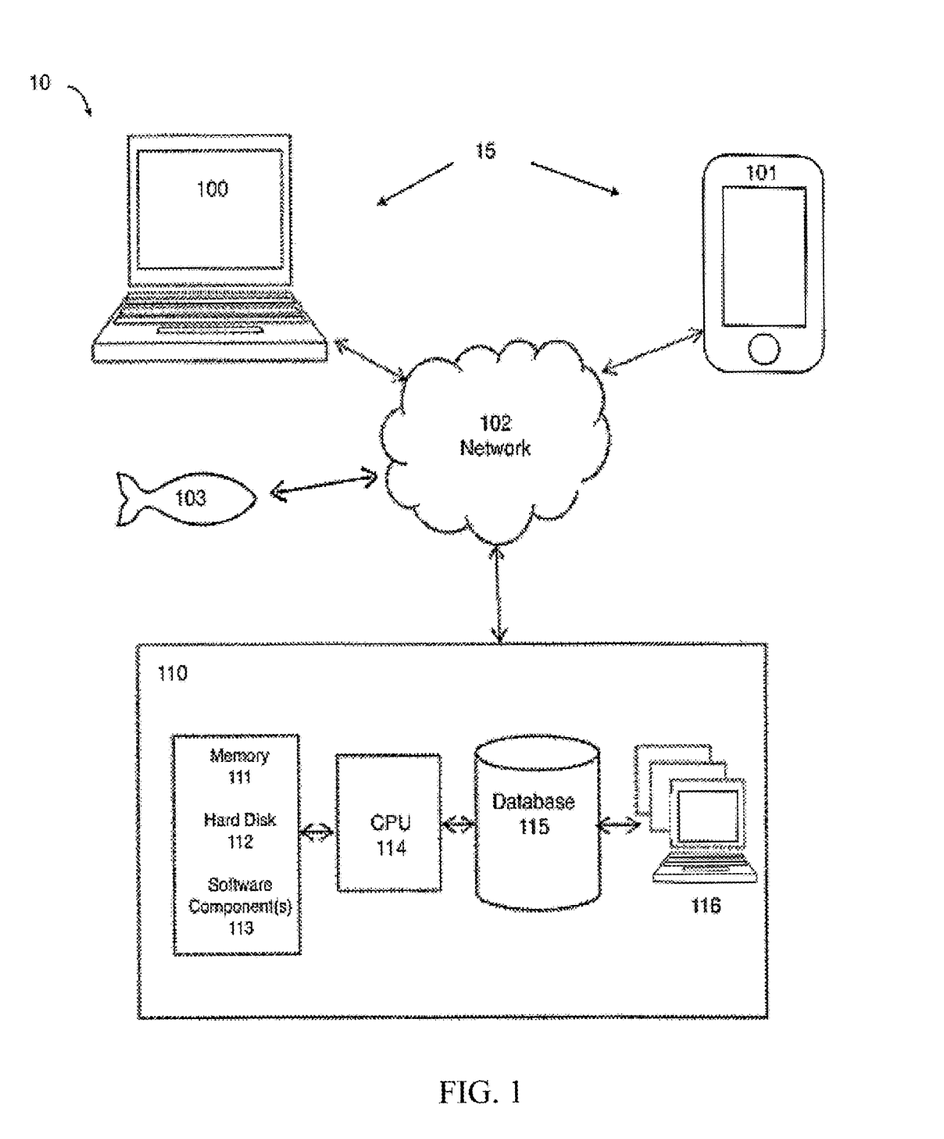
FIG. 1 is a schematic illustration of an embodiment of the augmented reality system of the present invention.

As illustrated in FIG. 1, the augmented reality application and system, generally referred to as 10, may comprise one or more software components 113 that interface with a wireless network 102 to allow one or more users of control hardware components 100, 101 (e.g, smartphones, laptop computers, etc) to create their accounts, access a remote server, and interact with one or more objects 103 that are also interfacing with the server 110, etc., over the network 102.

The term "network" or "communication link" is used to describe any public network, such as the internet or World Wide Web or any public or private network as may be developed in the future that provides a similar service as the present internet. The user's control hardware component may connect to the network via a variety of methods, including but not limited to, a network card, wireless network (cellular, satellite, infrared, radio, Bluetooth®, etc.), Local Area Network (LAN), Wide Area Network (WAN), a WiFi network, an ad hoc network or a combination thereof, or any such means as necessary to communicate to a server computer connected directly or indirectly to the network and/or to an object directly (without server communication). Such networks are widely used to connect various types of network elements, such as hubs, bridges, routers, switches, servers, and gateways. The communication link may include one or more connected networks (e.g., a multi-network environment) including public networks, such as the Internet, and/or private networks such as a secure enterprise private network.

Embodiments of the present invention comprise one or more control hardware components 100 and 101 in communication via a network 102 with a server 110 made up of one or more computers 116 containing memory 111 and at least one processor (i.e., CPU) 114 that house software components 113 for object 103 interaction and a database 115 that contains user records. In some embodiments of the present invention, the software component(s) run(s) on the server 110 and is/are accessed through the user's control hardware component's 100, 101 web browser. In further embodiments, the software component(s) is/are installed and executed on the user's control hardware component 100, 101 directly and in communication with further software component(s) located on the server 110. In additional embodiments, the software component(s) is/are installed and executed on the user's control hardware component 100, 101 and communication is directly with the object 103 via a network 102.

The server 110 comprises at least one computer 116 and a means for connecting to the network 102 (i.e., network card). The computer 116 comprises memory 111, such as random access memory (RAM) for program execution, a hard disk 112 for program storage (the hard disk could be any such device capable of storing data, including flash drives, removable media, etc.), one or more central processing unit (CPU) 114, and a database 115 of users' records comprising their account information. The server 110 may also comprise a web server. It is also contemplated by the present invention that the server 110 may further include software components 113 of the present invention that are executed from the server 110 as users interact over the network 102 via their various control hardware components 100, 101.

Figure 2:
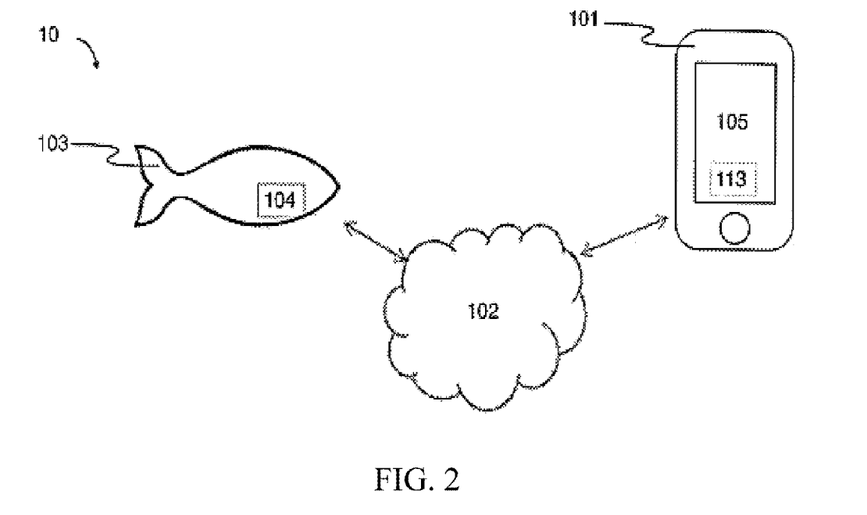
FIG. 2 is a schematic illustration of another embodiment of the augmented reality system of the present invention.

In one aspect as illustrated in FIG. 2, the augmented reality system 10 for providing remote control and interaction of an object in a space comprises an object 103 that includes an object hardware component 104; a control hardware component 101 with a display 105 for wirelessly transmitting and receiving signals via a communication link (e.g., a wireless network 102) to the object hardware component 104; and a software component 113 stored on a non-transitory computer-readable medium and in operable communication with the control hardware component 101. In some embodiments, the software component 113 further includes a user interface displayable on the display 105 for enabling a user to provide command input for controlling the movement of the object 103 via the object hardware component 104.

A "space" includes any area where the object(s) utilized in the reality system 10 is/are allowed to move and interact. It is contemplated by the present invention that a space can include any outdoor or indoor space. The space can include air, water and land. In preferred embodiments, the space includes aerial space within arenas and stadiums. As such, it is also contemplated that the exterior of the object(s) of the present invention may also include advertisements.

The object 103 can be any object that is configured with the ability to be mobile, such as, but not limited to, robotic fish and robotic animals. The object may be filled with, for example, helium thereby allowing it to float in the air. Such robotic fish and animals can be configured to move in "life-like" fashion. For example, robotic fish can have fins to provide movability of the fish. In a preferred embodiment, the robotic fish/animals are capable of floating in an aerial space.

The object hardware component 104 can include one or more microcontroller (such as an Arduino microcontroller), one or more sensors, and one or more motors. The motor(s) typically assist(s) in movement of the object (e.g., movement of a robotic fish tail from side to side). The sensor(s) can be sonar devices, microphone devices, and global positioning systems (GPS). In some embodiments, sonar devices are utilized and transmit sonar data to the microcontroller such that the object can move in its surrounding space while avoiding other objects in the space. In some embodiments, GPS devices are utilized to provide position coordinates of the object in space and/or to provide guidance in the space when the object is moving. Also, the object hardware component 104 can further include weighted mechanisms that provide movable weight on a rail to change the center of mass of the object 103 for sinking or elevating when utilized in an aerial or water environment.

The system 10 can be navigated by a user interacting with an electronic user interface that is preferably graphical. The user interface is displayable on the display 105 for enabling a user to provide command input for controlling the movement of the object 103 via the object hardware component 104. Each user interface can have at least some programming instructions to display command controls and receive a user's input and send such input to the object 103 via the communications link.

In a preferred embodiment, the object is an aerial robotic fish, dolphin, shark, or the like that is configured with at least one mechanically movable fin to simulate swimming motions of the object in air. The system allows a user to virtually interact with robotic fish, dolphin, shark, etc., which replicate swimming motions in the air. Using a microcontroller (such as an Arduino controller), sensors, and a motor, the fish tail moves from side to side, thereby mimicking the movements of the animal. Using the system, a user can manually control the direction of the robotic object's movements and location. The server manages and analyzes all aspects of the procedure.

Figure 3:
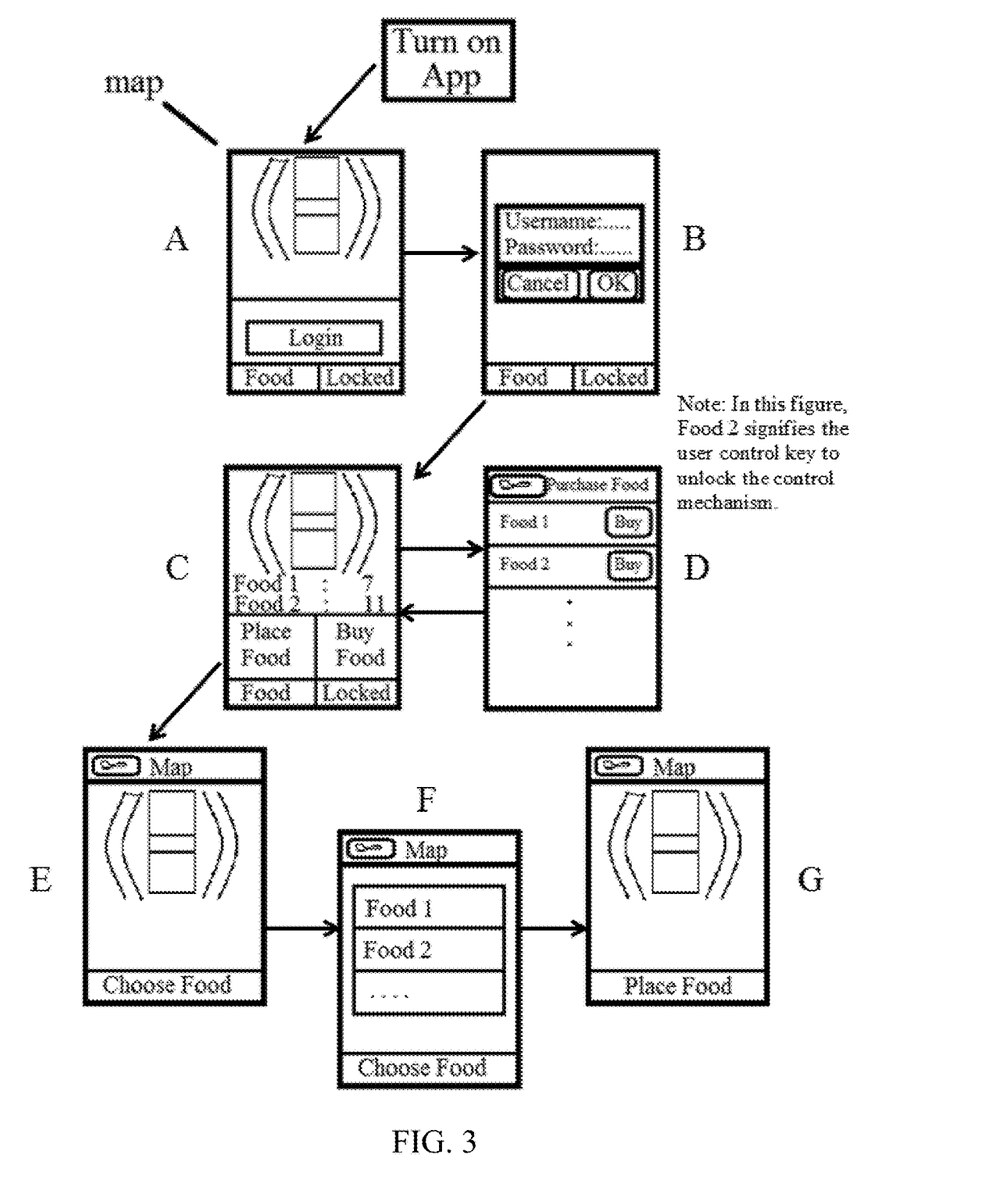
FIG. 3 is an illustration of several screenshots on a display of a control hardware component of an embodiment of the augmented reality system of the present invention.

As illustrated in FIG. 3, the software component 113 prompts a home screen (1A), allowing the user to select a login prompt. The basic login structure is then executed (1B). After login success, a user selects to place virtual food that is currently owned on a map shown on the display, or, alternatively, the user can select to purchase virtual food (1C). If the user selects to purchase food, the available foods are displayed (1D). If the user selects to place food, a map is displayed with a prompt for choosing the food to place on the map displayed on the control hardware component (1E). The user then selects the food to place (1F) and places it on the map (1G). Once the food is placed on the map, movement of the robotic fish occurs in the air in the direction of the physical location represented by the coordinates displayed on the map.

Figure 4:
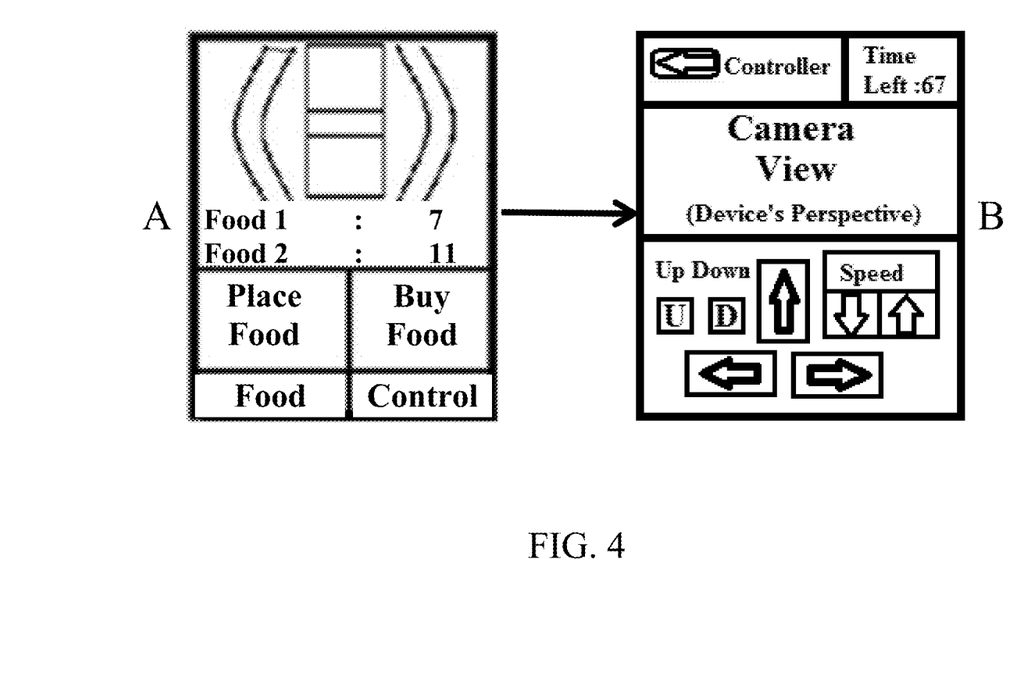
FIG. 4 is an illustration of screenshots on a display of a control hardware component of an embodiment of the augmented reality system of the present invention.

In some embodiments, certain virtual foods allow for a user to manually control the robotic fish once the food is "virtually" eaten. As shown in FIG. 4, once a "control" food is eaten, a user interface screen is displayed that enables control features (2A). The control feature screen (2B) may provide a limited timeframe for the user to have manual control of the robotic fish, providing the user with control of up, down, left, right, and speed. Furthermore, a camera view from the robotic fish's perspective can be displayed on the control hardware component. Once a pre-determined time elapses, a home screen will prompt further instruction from the user.

Figure 5:
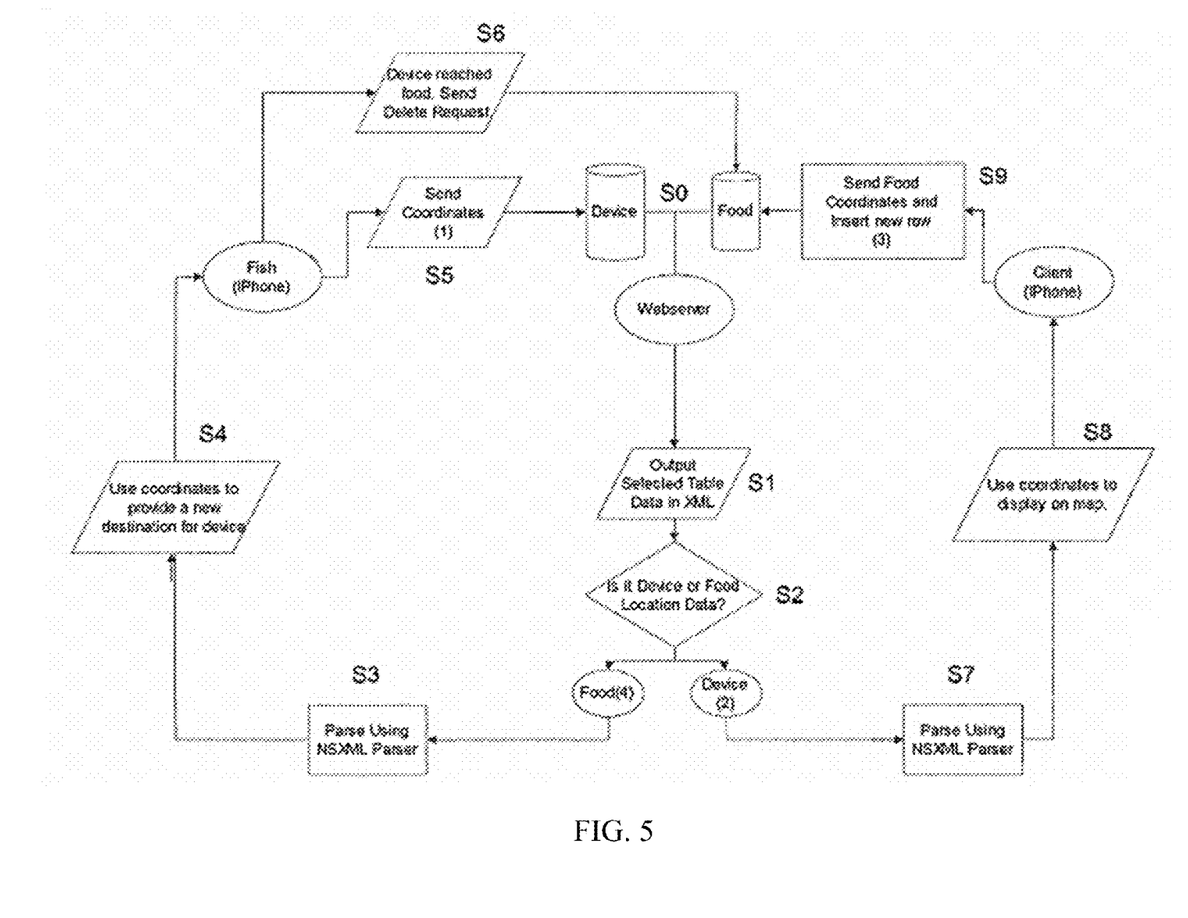
FIG. 5 is a flowchart illustrating an example operation performed by the software component of the system according to an embodiment of the invention.

FIG. 5 illustrates an exemplary method of operation performed by the software component of the system. The webserver (i.e., server) and related components are shown (S0). The selected database information is output in XML format (S1). In S2, if the data received is from the fish database, then data is parsed for the object (i.e., device) using the NSXML parser (food data) (S3). Using that data, the target coordinates of the object (e.g., fish) can be provided (S4). The object hardware component automatically sends coordinates to the fish database to update the current location values (S5). Once the object reaches the food, a delete query is sent to the food database (S6). In S2, if the data received is from the object location data, the data is parsed using NSXML for the client object (S7). These coordinates are used to display the current location of the fish on the client map (fish data) (S8). Then, once food is placed on the map, coordinates are sent to the food database and a new food item is added for the fish to collect (S9).

Figure 6A:
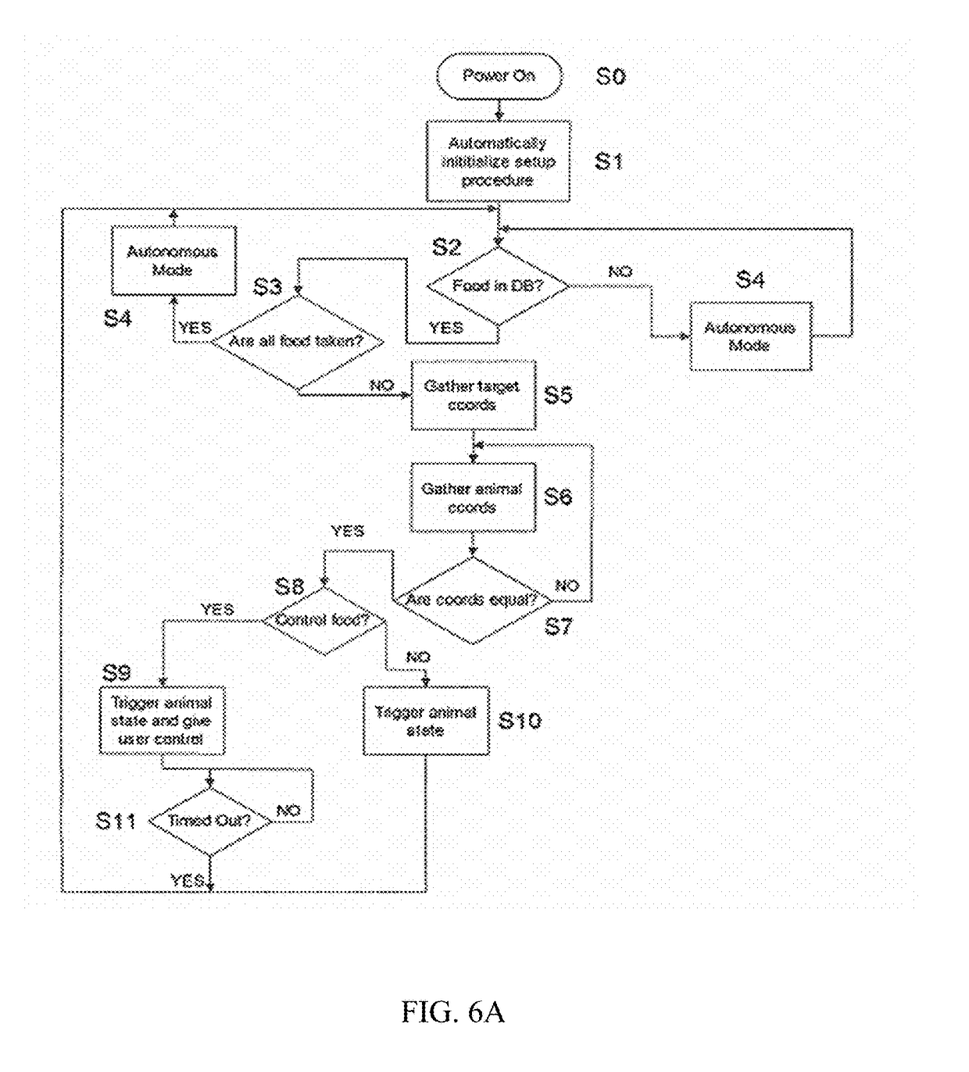
FIG. 6A is a flowchart illustrating an example operation performed by the system according to an embodiment of the invention.

FIG. 6A illustrates a flowchart showing an exemplary method of operation of the system. At S0, the device (i.e., object hardware component) is powered ON. The microcontroller of the device is initialized at S1. At S2, a simple SELECT query to the database is performed and if the response is NO, then move to S4, if YES then move to S3. At S3, it is queried whether all food is currently being pursued by animal devices. If YES move to S4; if NO move to S4. At S4, autopilot mode is initiated for the device when it is idle and there currently is no food to pursue. At S5, the coordinates are gathered from the database for the currently pursued food. Then, device coordinates are determined (S6). At S7, if the coordinates are not equal yet, S6 is repeated. Once the object is close to the coordinates of the food, simulation of the food being eaten by the object is performed. At S8, if the food is the special type of food that allows control of the device by the user, then S9 is initiated; otherwise, S10 is initiated. At S9, once the food is eaten, a tab will open up that allows the user to control the food that was eaten. At S10, if the food was not "control" food, the object will display emotions (state change) once it comes in proximity to the food. At S11, if the time allotted to the user has run out, step S2 is initiated. If time has not expired, S11 is repeated.

Figure 6B:
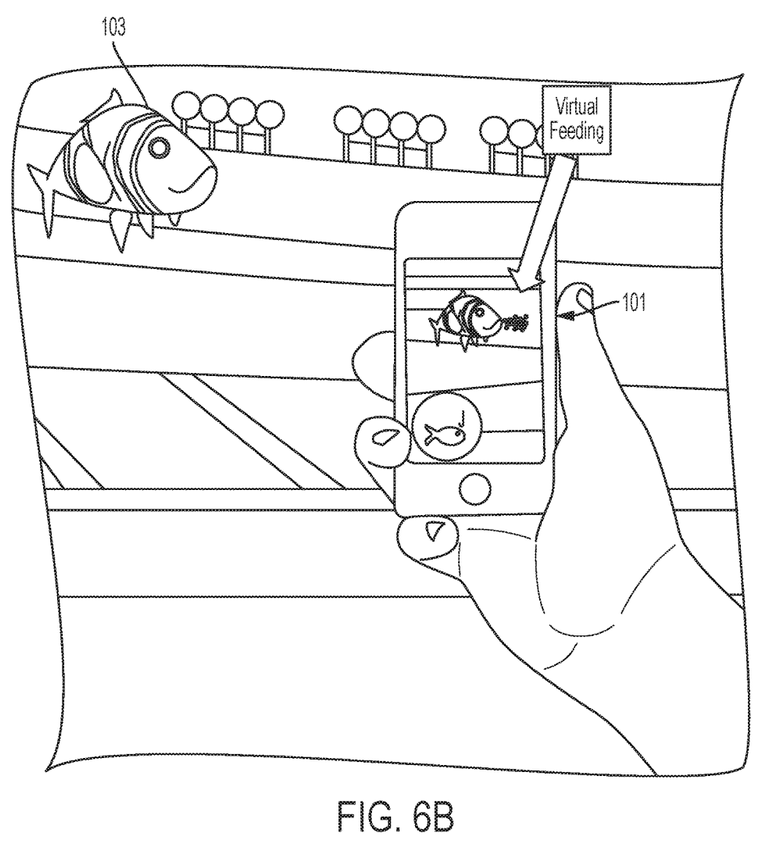
FIG. 6B is an illustration of an exemplary embodiment of the system being utilized for a virtual feeding of a robotic fish.

FIG. 6B illustrates exemplary operation of the system during a virtual feeding for an aerial object 103 (fish) in an open air stadium. As shown, an illustration of the object 103 is displayed on the object hardware component 101 (smartphone) as it approaches the virtual food. The object 103 illustration overlays a map of the aerial space of the stadium, along with the virtual food, to provide the augmented reality experience.

In some embodiments, an autonomous code providing collision avoidance presents another dimension of virtual interaction, thus enabling an object to seamlessly perform in an aerial environment occupied by a plurality of objects. The object hardware component 104 may utilize sonar and/or Bluetooth interaction between various other objects in the space to avoid collision. As such, a virtual aquarium is simulated by this exemplary embodiment by using fully autonomous and manually controlled robotic fish that can perform realistic swimming motions in the air. As it would be understood by those skilled in the art, and further contemplated by the present invention, such systems and methods can be utilized in additional virtual environments, such as for example, but not limited to, animals in a virtual zoo or simulated fishing in a virtual pond.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

We claim:

1. A system, comprising:
a movable physical object comprising an object hardware component, the object hardware component comprising a weighted mechanism providing a movable weight to change a center of mass of the movable physical object;
a server for wirelessly communicating with the movable physical object via a communication link in operable communication with the server;
a mobile computing device for wirelessly communicating with the server, the mobile computing device comprising a display; and
a software application stored on a non-transitory computer-readable medium of the mobile computing device, the software application comprising a user interface for enabling a user to view on the display of the mobile computing device a list of virtual food options obtained from the server and to purchase and place a virtual food on a map displayed on the display of the mobile computing device,
the software application further enabling the user to control movement of the movable physical object via the object hardware component during an allotted time, after the movable physical object has virtually eaten the virtual food on the map displayed on the display, using the mobile computing device, and
the system being configured such that user control of movement of the movable physical object during the allotted time comprises an ability for the user to control, using the mobile computing device, the movable weight to change the center of mass of the movable physical object.

2. The system of claim 1, the user interface further providing visual data received from the object hardware component via the display.

3. The system of claim 1, further comprising a positioning component in operable communication with the object hardware component, the positioning component for providing spatial data relative to the object's surroundings.

4. The system of claim 3, the spatial data being is-utilized for avoiding surrounding objects during movement of the movable physical object.

5. The system of claim 1, further comprising a video camera on the movable physical object in communication with the object hardware component, the video camera for streaming video to the display of the mobile computing device via the server.

6. The system of claim 1, the mobile computing device being a smartphone or a tablet computing device.

7. The system of claim 1, the movable physical object being an aerial object.

8. The system of claim 7, the aerial object being a robotic fish.

9. The system of claim 1, the movable physical object comprising an advertisement on an exterior thereof.

10. A system, comprising:
a movable physical object comprising an object hardware component, the object hardware component comprising a weighted mechanism providing a movable weight to change a center of mass of the movable physical object;
a computing device for wirelessly transmitting and receiving signals via a communication link to the object hardware component, the computing device comprising a display;
a video camera on the movable physical object in communication with the object hardware component, the video camera for streaming video to the display of the computing device via the communication link;
a positioning component in operable communication with the object hardware component, the positioning component for providing spatial data relative to the movable physical object's surroundings; and
a non-transitory computer-readable medium in operable communication with the computing device, the non-transitory computer-readable medium having a software application stored thereon, the software application comprising a user interface for enabling a user to view on the display of the computing device a list of virtual food options and to purchase and place a virtual food on a map displayed on the display of the computing device,
the software application further obtaining position coordinates of the virtual food from the positioning component, providing the position coordinates of the virtual food to the movable physical object, and providing commands to the movable physical object that is close to the position coordinates of the virtual food such that the moveable physical object moves physically to the position coordinates of the virtual food and virtually eats the virtual food,
the software application further enabling the user to control movement of the movable physical object via the object hardware component during an allotted time, after the purchase of the virtual food and after the movable physical object has virtually eaten the virtual food, using the computing device, and
the system being configured such that user control of movement of the movable physical object during the allotted time comprises an ability for the user to control, using the computing device, the movable weight to change the center of mass of the movable physical object.

11. The system of claim 10, the software application further providing visual data received from the object hardware component to the display of the computing device.

12. The system of claim 10, the spatial data being utilized for avoiding surrounding objects during movement of the movable physical object to the position coordinates of the virtual food.

13. The system of claim 10, the movable physical object being an aerial object.

14. The system of claim 13, the aerial object being a robotic fish.

15. The system of claim 10, the communication link being in operable communication with a server that wirelessly communicates with the movable physical object and the computing device via the communication link.

16. The system of claim 10, the computing device being a mobile computing device.

17. The system of claim 16, the mobile computing device being a smartphone or a tablet computing device.

18. The system of claim 10, the movable physical object comprising an advertisement on an exterior thereof.

* * * * *